Patented Oct. 31, 1944

2,361,488

UNITED STATES PATENT OFFICE 2,361,488

ASPHALT PAVING COMPOSITION AND A BLENDING AGENT FOR THE SAME

Louis A. Mikeska, Westfield, N. J., assignor to Standard Oil Development Company, a corporation of Delaware No Drawing. Application December 15, 1942, Serial No. 469,140

9 Claims. (Cl. 106—281)

This invention relates to improvements in the adhesivity of bitumens when used as bonding agents, especially when used to bond mineral aggregates, coat metals, etc.

It is known that mineral aggregates such as chips, sand, rock or similar material, in a moist condition when intimately mixed with tar, petroleum pitch, mixtures of tars, solutions of petroleum pitch or other bituminous substances, cannot be properly coated by the bitumen, and if coated, the adherence of the two products to each other may be exceedingly poor. It has, therefore been necessary in the past to carefully dry the mineral material before the preparation of the bituminous mixture. As a result, long delays in road building were occasioned by bad weather involving loss of time with corresponding mounting of costs.

It is also known that bituminous substances can be made to intimately adhere to rock aggregate by bringing the bituminous substance and the solid aggregate together in the presence of a primary or quaternary amine. While amines of this type improve the adherence of the bituminous substance to stone or rock aggregate, they are not, however, as effective when used with wet or damp road constructional materials. In particular, they suffer the shortcoming of being incapable of imparting complete adhesivity of the bituminous substance to the rock aggregates which are slightly moist or contain a substantial amount of water. Likewise, they do not effect satisfactory adherence of the bitumen to the rock or stone and the partial adherence which may be obtained is easily still further reduced, particularly by cool and damp weather. Moreover, the amines of the prior art are very difficult to synthesize from the commercial point of view since costly reduction methods must be employed in their manufacture. Also, it has been customary in the prior art to use the costly quaternary amines in the proportions ranging from 1% to 5%, these high concentrations of the active agent being necessary to obtain complete coverage of a wet aggregate.

The principal object of this invention is to provide novel means for obtaining a durable bond between the above-mentioned class of rock aggregates and the bitumen binder, whether the rock aggregate is damp, wet or dry.

Another object of this invention is to provide an inexpensive and readily available asphalt-aggregate bonding agent for purposes of road and airport construction.

According to this invention improved results are obtained when combining a bitumen, such as an asphalt, with a imidazoline of the general formula

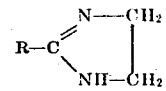

Wherein R is either a saturated or unsaturated alkyl group ranging from 10 to 23 carbon atoms.

The saturated alkyl group is selected from the following acids:

Lauric
Myristic
Palmitic
Stearic
Arachidic
Carnaubic and the unsaturated alkyl group is selected from the following acids:

Hypogeic
Oleic
Linoleic
Linolinic
Erucic

The imidazolines may be prepared in various ways but are most conveniently prepared by dehydration of mono acid amides of ethylene diamine:

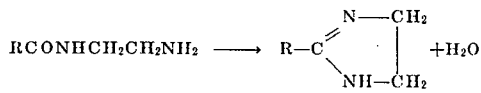

When the acids used in the preparation of the imidazolines are properly chosen as to molecular weight, and type of acid, the imidazolines thus obtained make highly effective blending agents for asphalts. Thus, heptadecyl imidazoline, which is obtained on condensation of stearic acid or stearic acid ester with ethylene diamine, when blended with medium curing cut-back asphalt from Venezuelan crude in 0.2% concentration gave a perfect coating on wet trap rock.

In general, the imidazoline prepared from unsaturated acids such as oleic acid, are even more effective as blending agents for asphalts than the azolines prepared from saturated acids.

The effectiveness of the imidazolines can be further enhanced by using polyethylene polyamines in the original reaction instead of ethylene diamine.

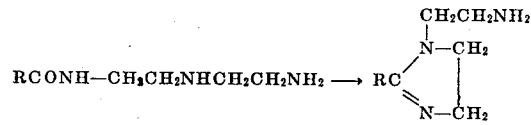

where R is either a saturated, unsaturated or substituted alkyl group ranging from 10 to 23 carbon atoms. The substituents in the alkyl group may consist of one or more chlorine atoms, amino, or hydroxyl groups.

The general method of preparing imidazolines for this particular purpose is in converting high molecular weight acids into esters which are in turn condensed with ethylene diamine. The amide is then converted into imidazoline according to the well-known procedure:

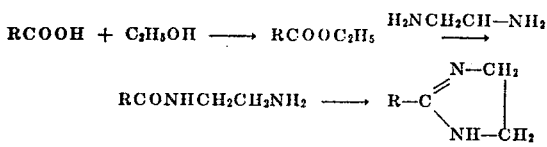

The imidazolines may also be prepared by direct action of alkylene diamines or the appropriate acids. These azolines when blended with asphalts have the property of markedly improving the adhesiveness of the asphalts to the rock aggregate.

For example heptadecyl imidazoline is prepared according to the following reactions:

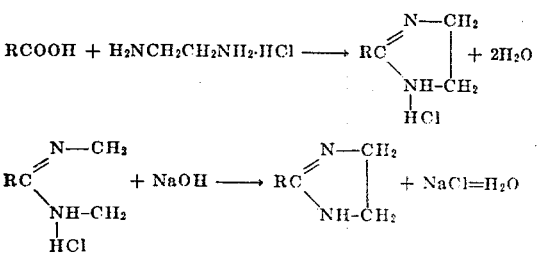

A 3-way flask equipped with a stirrer, a thermometer, and a return condenser attached through a water trap, was charged with 33.25 grams of ethylene diamine dihydrochloride (=¼ mol), 45 grams of ethylene diamine (=¾ mol), and 142 grams of stearic acid. The mixture was gradually heated to 165° C. and was kept at this temperature for about 45 minutes. Water and the excess ethylene diamine were meanwhile collected in the water trap.

The temperature was then rapidly raised to 300° C. and maintained at this point for 15 minutes.

44 grams of distillate was obtained which was found to contain 0.422 mol ethylene diamine.

On cooling, the reaction product consisting of 174 grams of a brown crystalline solid (177 grams =theoretical yield) was dissolved in hot water and neutralized with 20 grams of sodium hydroxide (aqueous solution). The imidazoline separated as a white, fluffy crystalline material. The latter was extracted from the warm solution with benzol.

On removal of the benzol, the residue was distilled under 3 mm. pressure. Practically all the material distilled at 225 to 228° C. In spite of high mechanical losses involved in carrying out small scale experiments, the over-all yield was better than 90% of the theoretical.

The distillate consisted of a cream colored crystalline material which melted at 94° C. It analyzed as follows:

Found: C=78.15, H=13.47, N=9.06.
Calculated: C=77.92, H=12.99, N=9.09.

The bonding agents of the present invention may be advantageously incorporated with the asphalt blend either by dissolving 0.1% to 1% (based on the asphalt) of the agent in one of the customary solvents such as naphtha, kerosene, tar oils, etc., and thoroughly mixing such solution with the heated asphalt or tar (about 200° F.) or by stirring the agent (an imidazoline) directly with the asphalt blend and heating the mixture to a temperature of about 150° F. for one-half to one hour.

The application of the asphalt compositions was effected by thoroughly mixing with the rock aggregate and curing one set of samples for one hour and the other set of samples for two hours at 140° F. The results obtained are shown in the following table. A Venezuelan rapid curing type cut-back asphalt was applied to a wet aggregate and a wet trap rock containing 2% of water.

TABLE I

*Heptadecyl imidazoline*

STRIPPING RESISTANCE TEST

| Dry rock per cent agent in Venezuelan rapid curing type cut-back | 1 hr. cure | 2 hr. cure | Wet trap rock (2% H₂O) | | |
|---|---|---|---|---|---|
| | | | Mixing ability | 1 hr. cure | 2 hr. cure |
| 0.2% | 95 | 95 | 100 | 100 | 100 |
| 0.1% | 80 | 80 | 90 | 30 | 50 |

Other imidazolines were prepared as follows: A steel bomb was charged with 142 grams (=½ mol) of pure stearic acid and 60 grams of ethylene diamine (=1 mol). The mixture was then heated at 320° C. for 2½ hours.

On cooling, the reaction product was found to consist of 198 grams of snow-white crystalline material, which on distillation yielded 124 grams of heptadecyl imidazoline, and 28 grams of higher boiling residue. This corresponds to 81% yield of the imidazoline. The excess ethylene diamine was recovered unchanged.

An Erlenmeyer flask was charged with 102 grams of n-butyl stearate and 100 cc. n-butyl alcohol. To this was added 33 grams of anhydrous ethylene diamine. The mixture was heated on the steam bath for 60 hours. On cooling, a crystalline precipitate was obtained which weighed 101 grams. On concentration of the filtrate, additional 10 grams of product were obtained. Without any further purification, this product proved to be equal to the best wetting agents previously prepared. The product melted between 92 and 93° C. Analysis proved the product to consist of heptadecyl imidazoline instead of the expected aminoethyl stearyl amide.

Found: C=78.44, H=13.43, N=8.88.
Calculated: C=77.92, H=12.99, N=9.09.

*Heptadecenyl imidazoline*

This compound was prepared by the following methods:

Heptadecenyl imidazoline was prepared exactly as shown for heptadecyl imidazoline (above) except that 141 grams of oleic acid was used instead of 142 grams of stearic acid.

On neutralization of the hydrochloride with alkali and removal of the benzol, 145 grams of the crude heptadecenyl imidazoline was obtained. 90% of the product distilled between 215° C. and 240° C. In this state of purity, the product melted at 56° C. and analyzed as follows:

Found: C=78.91, H=12.79, N=8.97.
Calculated: C=78.43, H=12.42, N=9.11.

In this state of purity, the product was equal to the best asphalt wetting agent previously prepared. The over-all yield was better than 90%.

A 3-way flask equipped with a stirrer, a thermometer, and a return condenser attached through a water trap, was charged with 200 grams of refined cottonseed oil, 44 grams of ethylene diamine dihydrochloride and 60 grams of anhydrous ethylene diamine. The mixture was heated with stirring for 1½ hrs. at 265° to 280° C. The water formed and the excess of ethylene diamine was caught in the water trap.

On cooling, the residual cake was dissolved in hot water and treated with a slight excess of aqueous NaOH. The base was then extracted with benzol. On removal of the benzol, 195 grams of a soft semi-crystalline product was obtained which, on distillation under 3 mm. pressure, yielded 165 grams of product distilling between 235 and 245° C. The product melted at 67–73° C. and analyzed as follows:

Found: N=9.47. Calculated: N=9.09.

The product was highly effective as a wetting agent for asphalts. Over-all yield is about 80%. The wetting agent is incorporated in the asphalt in a similar manner as that described for Example 1.

TABLE II
STRIPPING RESISTANCE TEST

| Dry rock per cent agent in Venezuelan rapid curing type cut-back | 1 hr. cure | 2 hr. cure | Wet rock (2% H$_2$O) | | |
| --- | --- | --- | --- | --- | --- |
| | | | Mixing ability | 1 hr. cure | 2 hr. cure |
| 0.2% | 95 | 100 | 100 | 95 | 100 |

The above examples illustrate the increase in stripping resistance which the combination of the imidazoline with asphalt affords.

In the above tables, the term "stripping resistance" is defined as the percentage of the aggregate surface still remaining coated with asphalt after the coated mixture has been cured for 1 hour at room temperature and then placed in water maintained at room temperature for a period of 20 hours.

The reaction products of an ester or a glyceride and polyalkylene polyamines as for example ethyl oleate and diethylene triamine, or triethylene tetra-amine may likewise be used.

Products of the following general formula may also be used:

$$R-C \underset{NH-CHR''}{\overset{N=CHR'}{\Big\langle}}$$

where R, R' and R'' are either alkyl or substituted alkyl groups.

I claim:

1. An improved bonding agent for bituminous material comprising a bituminous substance in combination with 0.1% to 1.0% of an organic imidazoline having the general formula:

$$R-C \underset{NH-CH_2}{\overset{N=CH_2}{\Big\langle}}$$

wherein R stands for a member of the group consisting of a saturated, unsaturated and substituted alkyl group having from 10 to 23 carbon atoms inclusive.

2. An improved bonding agent for bituminous material comprising a bituminous substance in combination with 0.1% to 1.0% of an organic imidazoline having the general formula:

$$R-C \underset{NH-CHR''}{\overset{N=CHR'}{\Big\langle}}$$

wherein R is an alkyl group having from 10 to 23 carbon atoms inclusive, R' and R'' stand for a member of the group consisting of alkyl and substituted alkyl groups.

3. An improved bonding composition which comprises an asphalt containing from 0.1% to 1.0% of an imidazoline having 10 to 23 carbon atoms.

4. An improved bonding composition which comprises an asphalt containing 0.1% of heptadecyl imidazoline.

5. An improved bonding composition which comprises an asphalt containing 0.1% of heptadecenyl imidazoline.

6. A paving mixture comprising a mineral aggregate bonded with a bituminous material containing 0.1% to 1.0% of an organic imidazoline having the general formula $$R-C \underset{NH-CH_2}{\overset{N=CH_2}{\Big\langle}}$$

where R stands for a member of the group consisting of a saturated and unsaturated alkyl group ranging from 10 to 23 carbon atoms.

7. A paving mixture comprising a mineral aggregate with a bituminous material containing from 0.1% to 1.0% of an imidazoline having the general formula:

$$R-C \underset{NH-CH_2}{\overset{N=CH_2}{\Big\langle}}$$

where R stands for a member of the group consisting of a saturated and an unsaturated alkyl group having from 10 to 23 carbon atoms.

8. A paving mixture comprising a mineral aggregate with a bituminous material containing from 0.1% to 1.0% of an imidazoline having the general formula:

$$R-C \underset{NH-CH_2}{\overset{N=CH_2}{\Big\langle}}$$

where R is a mono chloro substituted alkyl group having from 10 to 23 carbon atoms.

9. A paving mixture comprising a mineral aggregate with a bituminous material containing from 0.1% to 1.0% of an imidazoline having the general formula:

$$R-C \underset{NH-CH_2}{\overset{N=CH_2}{\Big\langle}}$$

where R is a poly chloro substituted alkyl group having from 10 to 23 carbon atoms.

LOUIS A. MIKESKA.